United States Patent [19]

Johnson

[11] 4,250,151

[45] Feb. 10, 1981

[54] RECOVERY OF SULFUR FROM GAS STREAMS CONTAINING SULFUR AND SULFUR COMPOUNDS IN DILUTE CONCENTRATION

[75] Inventor: Herbert S. Johnson, Oakville, Canada

[73] Assignee: Gulf Canada Limited, Toronto, Canada

[21] Appl. No.: 72,389

[22] Filed: Sep. 4, 1979

[51] Int. Cl.³ .................. C01B 17/16; C01B 17/00
[52] U.S. Cl. .................................. 423/230; 423/242; 423/575; 423/576
[58] Field of Search .......... 423/242 A, 242 R, 244 A, 423/244 R, 570, 574 L, 575, 576, 230

[56] References Cited

U.S. PATENT DOCUMENTS

| | | | |
|---|---|---|---|
| 1,892,999 | 1/1933 | Ralston et al. | 423/576 |
| 1,941,623 | 1/1934 | Rosenstein | 423/576 |
| 3,149,920 | 9/1964 | Urban | 423/575 |
| 4,113,840 | 9/1978 | Hanway et al. | 423/242 |

FOREIGN PATENT DOCUMENTS 993514  5/1965  United Kingdom ............... 423/230

*Primary Examiner*—O. R. Vertiz
*Assistant Examiner*—Gregory A. Heller
*Attorney, Agent, or Firm*—D. R. Morrison

[57] ABSTRACT

A process is disclosed for removing and recovering from gas streams the sulfur values of dilute concentrations of sulfur vapor, hydrogen sulfide, and sulfur dioxide which are not recoverable by previously known methods. The gas streams are scrubbed with aqueous suspensions of solid catalytic material which precludes formation of collodial sulfur in the aqueous suspension and collects the sulfur values as solid sulfur deposit, which is recovered during restoration of catalytic activity of the solid catalytic material.

9 Claims, No Drawings

RECOVERY OF SULFUR FROM GAS STREAMS CONTAINING SULFUR AND SULFUR COMPOUNDS IN DILUTE CONCENTRATION

This invention relates to the recovery of sulfur, and more specifically, to the removal of sulfur present in various forms including elemental sulfur vapor, liquid elemental sulfur droplets, and a mixture of the sulfur compounds hydrogen sulfide and sulfur dioxide, all present in dilute concentration in entraining gases. In particular, the invention is intended primarily to remove significant proportions of elemental and combined sulfur from the effluent gases of Claus process plants operating to convert hydrogen sulfide to elemental sulfur for recovery.

Claus process plants are used in such industries as petroleum refineries and natural gas treating plants, to convert the poisonous hydrogen sulfide evolved from petroleum refining operations or scrubbed from natural gas (which as collected from some gas wells may contain as much as 25% to 40% hydrogen sulfide). In the Claus process, hydrogen sulfide is reacted with air to form elemental sulfur and water as the major products. The elemental sulfur so formed is condensed from the vapor state and largely recovered from the uncondensed gases which are principally water vapor and nitrogen, with some uncondensed sulfur vapor, unreacted hydrogen sulfide and sulfur dioxide, and some carbon disulfide and carbon oxysulfide from the feed to (or formed in) the Claus plant operation.

The uncondensed effluent gases from Claus process plants are usually incinerated so that residual sulfur is discharged as dilute sulfur dioxide from the incinerator stack. Total emission of sulfur dioxide is measured in the stack and it is this emission which is subject to upper limits by environmental agencies. Despite the considerable progress that has been made in reducing the proportion of sulfur in various forms that passes out in the effluent gases and is finally discharged as sulfur dioxide, ultimately chemical and physical equilibria set upper limits on the efficiency of the plants and further recovery must be achieved by a separate plant process wherein the conditions of operation permit additional sulfur recovery. Several such processes are known in the art and some are in commercial operation.

Water-scrubbing of effluent gas streams is widely practised, but attempts to apply this procedure to Claus process effluent gas encounter a serious difficulty, namely the tendency toward formation of colloidal sulfur in the aqueous medium. Colloidal sulfur can be formed by the contact of sulfur vapor with water. It is also produced by the complex series of chemical reactions which occur when hydrogen sulfide and sulfur dioxide react in the presence of water. In this sequence of reactions, thiosulfuric and polythionic acids are formed, some of which exhibit intermediate stability, and gradually decompose with formation of elemental sulfur in colloidal form. In this form, the sulfur cannot be readily separated from the water. Moreover, it causes serious problems in operation by plating out, over time, in critical regions of the plant.

It has now been found that the problem of controlling the deposition of elemental sulfur, whether from pre-existing elemental sulfur vapor or from the aqueous reaction of hydrogen sulfide and sulfur dioxide, can be solved by the addition of certain catalytic solids, in finely divided particulate form, to the aqueous scrubbing medium. These catalytic solids are those known in the art for their ability to catalyze the vapor phase reaction of hydrogen sulfide and sulfur dioxide in systems which operate above the water dewpoint, namely alumina and activated carbon. It could not be predicted, however, that the presence of these catalytic solids would, for practical purposes, substantially completely inhibit the aqueous phase reaction sequence which has been referred to above, and which leads to formation of colloidal sulfur in the bulk aqueous phase, nor that such catalytic solids would entirely inhibit the formation of colloidal sulfur when elemental sulfur vapor contacts the aqueous system. It is now found that such inhibition does occur in the presence of such catalytic solid particles. On the basis of this finding, it becomes possible to devise processes for scrubbing of Claus process effluent gas streams employing aqueous slurries of activated carbon or alumina.

It has also been found that the finely divided catalytic solids which are effective for the present invention and which accumulate sulfur thereon during the process of the invention by deposition of sulfur, thereby undergoing a decrease in effectiveness, can be regenerated to restore them substantially completely to their original activity without destroying or consuming a significant proportion of the catalytic material.

The invention therefore consists in a process for treating a gas stream for the removal of sulfur vapor, entrained liquid sulfur droplets, and admixtures of hydrogen sulfide and sulfur dioxide, present in dilute concentration in said gas stream, which comprises intimately contacting the gas stream with an acidic aqueous suspension of a finely divided catalytic material of the group alumina and activated carbon, the acidity of said suspension being that generated by absorption of acidic components of the gas stream.

The invention further consists in a method for the regeneration of the finely divided catalytic solid material having an accumulation of sulfur deposited thereon by the process for treating a gas stream as aforesaid, said method comprising (1) separating the finely divided material from the aqueous medium wherein it has contacted the gas stream, (2) passing through said material a fluid of the group consisting of a liquid solvent for sulfur and gases nonreactive with said material, at temperature sufficient to dissolve sulfur when the fluid is a liquid solvent and to melt and volatilize sulfur when said fluid is gaseous, until absorbed sulfur has been separated from the catalytic material sufficiently to restore its catalytic activity. The invention still further consists in regenerating a finely divided catalytic solids material by the method as aforesaid and returning the regenerated catalyst in the form of an aqueous dispersion as the catalyst in a process for treating a gas stream as aforesaid.

The intimate contacting of the gas stream with the aqueous slurry, in accordance with the process of the present invention, may be achieved by use of any suitable type of gas-liquid contacting equipment. Such equipment includes, for example, scrubbing towers, such as packed towers and sieve plate or bubble cap towers, cyclone scrubbers, jet scrubbers, spray scrubbers, cascade scrubbers and Venturi scrubbers. Preferred as the most practical device for contacting the gas with the slurry is the Venturi scrubber.

The aqueous suspensions or slurries of alumina or activated carbon used can be prepared readily with, for example, commercially available finely divided grades of alumina used in Claus process converters or with various types of powdered or relatively fine granular activated carbon on the market. The proportion of the suspended solid material in the aqueous suspension for the process of this invention generally is in the range from substantially 1% to substantially 10% by weight; proportions below the foregoing have uneconomically low capacity for removing sulfur in its various forms from the gas, and proportions greater than the foregoing may tend to create problems in handling the slurries. A preferred range of solid in the aqueous suspension is from 3% to 7%.

In the process of the invention, during the contacting step, the finely divided catalytic material acts as a deposition site for the sulfur removed from the gas stream as well as acting to catalyze reaction of hydrogen sulfide and sulfur dioxide; hence, there is a limit to the amount of sulfur that can be removed from a gas stream by a given quantity of catalytic material before it must be freed of accumulated sulfur. In general, a practicable limit for deposition of sulfur on the catalytic material is a weight equal to the dry weight of the material itself, after which it is expedient to regenerate the material for reuse by removal and separation of the sulfur therefrom. Thereafter the catalytic material can again be dispersed in water and the suspension thereof used to contact a gas stream for removal of sulfur according to the invention.

Because the gas streams requiring sulfur removal generally are at temperatures above the atmospheric boiling point of water and are not saturated with moisture, there will be significant amounts of heat transferred to the aqueous suspension and evaporation of water therefrom. A specific slurry operating temperature can be set at which water evaporation from the slurry will be effectively nil. This temperature can be maintained, for example, by provision of a heat exchanger in a slurry circulation loop. In an alternative mode, heat removal can be accomplished by allowing evaporation of water from the slurry and employing make-up water to maintain the slurry volume. Combinations of the features of the alternative modes also can be used. The cooling provision preferably will maintain the temperature of the contacting suspension in the temperature range from 60° C. to 80° C., most preferably from 65° C. to 75° C.

The efficiency of removal of sulfur in all its various forms from a gas stream by the process of the invention depends on several factors. These include, among others, the efficiency of the gas-liquid contacting apparatus used to achieve the desired intimate contacting, the specific type and proportion of the catalytic material in the suspension, and the degree of sulfur loading on the material from gas previously contacted. Under conditions of good efficient operation it can be expected that 50% or more of the sulfur in all its various forms will be removed from the effluent gas stream of a Claus process plant, thus reducing, by more than half, the amount of sulfur that must be incinerated and dissipated into the atmosphere or passed to further sulfur recovery units.

Inasmuch as there is a limit to the amount of sulfur that a given quantity of catalytic material can remove from a gas before the material becomes inefficient, it is necessary to regenerate the material to restore its efficiency if the process is to operate economically. Regeneration of the catalytic material is easily achieved, once it has been separated from the aqueous phase, by heating the material above the melting point of sulfur, for example with a stream of air, superheated steam, other inert gas, or mixture of any of the foregoing, to drive off the sulfur in a stream of gas from which it can be condensed. Preferably superheated steam or a mixture of hot combustion gases and superheated steam is used in regenerating activated carbon, as such gases avoid consumption of the carbon by partial combustion thereof. It is also possible to remove the sulfur from the catalytic material and thereby regenerate it by dissolving the sulfur therefrom with a suitable liquid solvent for sulfur, for example carbon disulfide or xylene, in a suitable extraction process, then separating the solid catalytic material from the liquid solution, for example by filtration. The whole overall process of recovering regenerated catalyst from an aqueous suspension of solid catalytic material with the deposited sulfur thereon is facilitated by the fact that the solid catalytic material is readily separated from the aqueous suspension by filtration and can be regenerated in situ on the filter medium (after drying if desired), for example by passage of either hot inert gas or gases therethrough to drive off the sulfur or by passage of liquid solvent for sulfur therethrough to dissolve the sulfur; by such operations the catalytic material can then be recovered from the filter medium, reslurried in water, and recycled for intimate contacting again with a gas stream containing sulfur and sulfur compounds.

The following examples are given to illustrate operability and practicality of various aspects of the invention, but are not intended to place any limitations on the invention which is defined in the ensuing claims. The examples establish the operability and effectiveness of the aqueous suspensions of solid catalytic material separately and individually to remove mixtures of hydrogen sulfide and sulfur dioxide from a stream of gas and to remove sulfur vapor from a stream of gas, in each case without the development of colloidal sulfur in the aqueous phase. The examples further establish the regenerability of the solid catalytic material after it has become loaded with sulfur removed from a gas stream containing sulfur in a form which deposits free sulfur on the solid. All percentages expressed throughout the disclosure and claims are percentages by weight unless otherwise specifically indicated.

The following example illustrates the effectiveness of an aqueous suspension of activated carbon in removing sulfur vapor from a gas stream.

EXAMPLE 1

To prepare a suspension of activated carbon, 1.0 gm "Aqua Nuchar A" (trademark) activated carbon was dispersed in 100 ml of water in a vigorously stirred vessel at room temperature. A stream of preheated nitrogen gas flowing at a rate of 1.2 liters/min. was led over a body of molten sulfur held at 182° C. (360° F.), and the resulting stream of dilute sulfur vapor was led via a heated tube at a temperature of 160° C. into the vigorously stirred suspension. The exit gas from the suspension was passed through a plug of glass wool at ambient room temperature in a 2.5 cm diameter glass tube to retain sulfur which had passed unabsorbed through the aqueous suspension. After two hours of operation, the suspension was filtered through a filter paper and yielded a clear filtrate, indicating the absence of any colloidal sulfur that might have formed from the contact of sulfur vapor with water. The filter cake of carbon and sulfur was dried for two hours at 110° C.

then extracted in a Soxhlet apparatus with carbon disulfide solvent for two hours. From the extract, 0.244 gm of solid sulfur was obtained. Soxhlet extraction of the glass wool plug with carbon disulfide then was found to yield 0.166 gm of solid sulfur. The efficiency of removal of sulfur from the gas stream by the aqueous suspension of activated carbon thus was 59.5%.

The following example illustrates the effectiveness of bauxite (alumina) in aqueous suspension for removing dilute admixed hydrogen sulfide and sulfur dioxide from a gas stream.

EXAMPLE 2

Finely ground bauxite prepared by grinding a Claus process commercial pelleted catalyst, in the amount of 2.5 gm, was dispersed in 250 ml water in a laboratory flask having an inlet line for a gas stream, an outlet for withdrawal of aqueous slurry, and a top opening for connection to the bottom of a contacting device comprising a commercial laboratory vacuum jacketed distillation column section of two-inch (five cm) inside diameter having five sieve tray plates with downcomers. A "Moyno" (trademark) positive displacement pump was connected to the flask to withdraw slurry therefrom continuously and pump it to the top of the distillation column, from whence it flowed by gravity down the column and back into the flask while a gas stream, forced into the flask through the gas inlet, flowed up through the column and contacted the slurry on the sieve plates, thence to a vent pipe. A test gas stream was prepared by continuously metering nitrogen gas, hydrogen sulfide gas, and sulfur dioxide gas at rates of 3 liters/min., 60 ml/min., and 30 ml/min. respectively into the inlet line, the proportions giving a mixture containing substantially two volume percent hydrogen sulfide, one volume percent sulfur dioxide, and ninety-seven volume percent nitrogen. The stream of test gas was passed into the flask and up through the distillation column to contact the continuously recirculated slurry over a period of 50 minutes, during which time the temperature of the circulating slurry was maintained at 77° C. by application of heat to the flask. At the end of the measured time period, the slurry was filtered and the filtrate found to be clear and free of colloidal sulfur. The recovered bauxite was dried then extracted with carbon disulfide and found to contain 17.5% free sulfur (based on the original dry sulfur-free bauxite weight) which had been removed from the test gas containing no free sulfur. The efficiency of removal of sulfur from the test gas was calculated to be 6.6%; this relatively low efficiency was at least partly attributable to the lower effectiveness of alumina as a catalyst in the invention and also perhaps to the lack of sufficient intimate contact of the test gas with circulating slurry in the simple five plate contacting column.

The following example illustrates the effectiveness of activated carbon in aqueous suspension for removing dilute admixed hydrogen sulfide and sulfur dioxide from a gas stream, and illustrates further the regeneration of the active carbon for reuse in said operation after it has been in use long enough to become extensively loaded with absorbed free sulfur. By use of appropriate convenient apparatus the example also illustrates the ease with which successive absorptions and regenerations of the active carbon can be carried out.

EXAMPLE 3

The relatively simple apparatus for this example comprised essentially a glass tube (4.4 cm outside diameter) with a sintered glass plate in the bottom section, about 25 cm from the top. Connections at the top and bottom of the tube permitted introduction of an aqueous suspension of carbon on top of the sintered plate, introduction of a gas stream below the plate to bubble up through aqueous suspension thereon and venting of the gases at top; the connections also permitted the introduction of steam or other regenerating fluid above the sintered plate and withdrawal of fluid medium below the plate for a regeneration step. The apparatus was enclosed in a heating facility so that the temperature thereof could be raised to a high level during regeneration of carbon on the plate. To start the operation, a flow of 1.3 liters/min. of nitrogen gas into the tube through the bottom was established, and 5 grams of "Nuchar SN" (trademark) activated carbon suspended in 100 ml of water was added on top of the plate where it remained as the gas bubbled up through it. Heat was applied by the heating facility to maintain the aqueous suspension at a steady temperature of substantially 70° C. Flows of hydrogen sulfide and sulfur dioxide were then added to the flow of nitrogen into the tube, at rates of 40 and 20 ml/min. respectively, and the operation continued for a measured period of two hours, during which time the concentration of sulfur dioxide in the exit gas being vented above the suspension was continuously monitored with a Miran (trademark) infra-red analyzer. The slight increase in this monitored concentration which occurred during the two-hour interval indicated a substantially uniform and only slightly decreasing efficiency of conversion of the sulfur dioxide during the conversion period. During the period, occasional additions of a few milliliters of water were made to the suspension to maintain its volume substantially around 100 ml, compensating for the water lost in the gas stream by evaporation. By periodic iodometric titration analysis of samples of both the feed gas and the exit gas vented above the aqueous suspension, the efficiency of removal of sulfur compounds from the feed gas during passage through the carbon suspension was calculated to be 41.5%. At the end of the two-hour operation the feed gas streams were halted and a slight pressure applied above the aqueous suspension to force the water thereof through the plate and leave a filter cake of carbon with absorbed sulfur on the plate. A water-cooled condenser was then connected to the bottom of the tube and a flow of superheated steam introduced above the carbon with the temperature in the tube being raised by means of the superheated steam to substantially 900° F. (482° C.) as measured by a thermocouple inserted in the carbon, thereby melting, vaporizing, and entraining the sulfur deposited on the active carbon and removing it to the condenser below where the steam and sulfur condensed and were recovered as a white milky dispersion of sulfur in water. At the end of the two hours of steaming the regeneration of the active carbon by removal of sulfur was considered adequate, and the gas stream of mixed nitrogen, hydrogen sulfide, and sulfur dioxide was re-established through the tube with the same flow rates as previously, and with an addition of 100 ml of fresh water to the loose, powdered carbon on the plate as a suspension medium therefor. Again continuous infra-red analyzer monitoring of the sulfur dioxide concentration in the exit gas for the ensuing two hours showed that only a slight increase occurred in the concentration during this interval, indicating an efficiency of conversion that decreased only slightly during the interval. Periodic iodometric analysis of samples of the feed gas and exit gas established that the efficiency of conversion of the sulfur compounds to free sulfur in the suspension during the interval was 50%. At the end of this interval the water of the aqueous suspension was filtered through the plate and the carbon filter cake again steamed for two hours with a flow of superheated steam as previously, to remove sulfur therefrom. Following this the flow of the mixed gas stream was again established as previously, with water added to the carbon on the plate to form a suspension through which the gas stream was bubbled for a further two-hour reaction period and with continuous infra-red monitoring of the exit gas. Again the monitoring established that there was only a slight decrease in the conversion efficiency during the two hours of operation, and periodic iodometric analysis of the feed and exit gas streams showed that the efficiency of conversion during the run was 45.5%. These efficiency of conversion values were within a reasonable range in the same order of magnitude and established adequately that the active carbon could be regenerated and reused without loss of efficiency. To confirm the authenticity of the sulfur removal efficiencies for the three successive two-hour reaction periods, the milky dispersions of sulfur in water obtained from the condenser during the first two regeneration periods were separately evaporated at 110° C. and the weights of sulfur in the residues measured; the carbon with its absorbed sulfur from the third two-hour reaction period was extracted in a Soxhlet extractor with carbon disulfide, then the carbon disulfide was evaporated and the weight of sulfur residue determined. The weights of sulfur thus recovered from the three successive regeneration steps were in satisfactory agreement with the calculated values of sulfur removal from the feed gas based on the analysis of the feed gas and vent gas compositions.

The following example also illustrates the effectiveness of activated carbon in aqueous suspension for removing dilute admixed hydrogen sulfide and sulfur dioxide from a gas stream and additionally illustrates the regeneration of the active carbon for reuse in said operation after it has been in use long enough to become extensively loaded with absorbed free sulfur, like the preceding Example 3, but this time the regeneration is achieved by extracting the sulfur from the carbon with hot liquid xylene.

EXAMPLE 4

As in Example 3, the apparatus for removing the dilute sulfur compound gases from the gas stream included the glass tube with sintered glass plate in the bottom section, top connections for a vent and introduction of aqueous medium and regenerating medium, and bottom connections for introduction of feed gas and removal of liquid extractant. Likewise as in Example 3, a flow of 1.3 liters/min. of nitrogen gas, 40 ml/min. of hydrogen sulfide, and 20 ml/min. of sulfur dioxide was bubbled through a suspension of 5 grams of "Nuchar SN" activated carbon in suspension in 100 ml of water on the sintered plate for periods of two hours, with the suspension being maintained at substantially 70° C. by a heating facility around the tube and with occasional additions of liquid water to the suspension to maintain its volume around 100 ml. As previously, in each of these two-hour reaction periods 9.4 grams of sulfur, in the form of the gaseous sulfur compounds, was introduced into the carbon suspension. The concentration of sulfur dioxide in the exit gases was monitored throughout the two-hour reaction periods and found to increase only slightly during each two-hour run. At the end of each of five such successive absorption runs, the feed gas flow was stopped, and filtration commenced, aided by application of inert gas pressure above the carbon suspension. At the end of this operation a wet carbon filter cake remained on the sintered plate. At this point the bottom of the reactor tube was connected to a tared liquid recovery flask through a water trap, and a flow of xylene vapor from a source of boiling xylene was connected to the top of the tube. The xylene vapor forced residual water through the sintered plate as xylene condensed on the carbon, and the xylene in turn filtered through the carbon filter cake and sintered plate into the recovery flask. In filtering through the filter cake the hot xylene condensate dissolved sulfur absorbed by the carbon, and the flow of xylene vapor was continued until the temperature in the filter cake reached 260° F. (127° C.), i.e. well above the boiling point of the water-xylene azeotrope, indicating that all the water was removed from the filter cake and the carbon was completely contacted by the xylene. When the xylene flow was stopped, the liquid xylene in the recovery flask was distilled therefrom the reuse and the weight of the residue of sulfur extracted from the carbon during the regeneration period and remaining in the flask was measured. The weights of sulfur so obtained for the five successive regeneration periods following the five absorption runs respectively were 5.2, 3.9, 3.9, 4.2 and 4.4 grams. These weights corresponded respectively to 55.3%, 41.5%, 41.5%, 44.7% and 46.8% of the sulfur fed (as sulfur compounds) to the active carbon suspension during the two-hour absorption runs preceding the respective regeneration periods. These sulfur recoveries established the effectiveness of hot liquid xylene to remove absorbed sulfur from the active carbon and also established that, although an initial high value of sulfur removal efficiency was not fully maintained on regeneration, the drop in efficiency was tolerable and was not continuous, the recoveries (and corresponding removal efficiencies) clearly having levelled off at an acceptable level near 50%.

The foregoing examples have illustrated various aspects of the invention. In addition it can be pointed out that the invention may be adapted to achieve a reduction in the overall amount of sulfur present as sulfur dioxide in dilute concentration in, for example, a furnace stack gas or a sulfide ore roasting process effluent. Such gaseous streams, normally still containing sulfur dioxide even after primary treatment but containing no hydrogen sulfide, may be treated in accordance with the present invention by first adding a stoichiometric proportion of hydrogen sulfide thereto to achieve reaction with the sulfur dioxide to form elemental sulfur, then intimately contacting the augmented stream with an aqueous suspension of solid catalytic material in accordance with the process of the invention as previously described herein.

Numerous modifications of the specific expedients described herein can be made without departing from the scope of the invention which is defined in the following claims.

I claim:

1. A process for treating a gas stream for the removal of sulfur vapor, entrained liquid sulfur droplets, and admixtures of hydrogen sulfide and sulfur dioxide, present in dilute concentration in said gas stream, which comprises intimately contacting the gas stream with an acidic aqueous suspension of at least 1%, by weight of the suspension, of a finely divided catalytic material of the group alumina and activated carbon, the acidity of said suspension being that generated by absorption of acidic components of the gas stream, to deposit sulfur values from the gas stream as solid sulfur absorbed on the catalytic material.

2. A process as claimed in claim 1 in which the aqueous suspension contains from 1% to 10% by weight of the finely divided catalytic material.

3. A process as claimed in claim 1 in which the aqueous suspension of catalytic material is maintained at temperature in the range from 60° C. to 80° C.

4. A process as claimed in claim 1 in which the temperature is in the range from 65° C. to 75° C.

5. A process as claimed in claim 1 in which intimate contacting of the gas stream with the aqueous slurry is achieved by use of a Venturi scrubber.

6. A process as claimed in claim 1 and including the additional steps of
(1) separating the finely divided catalytic material from the aqueous medium wherein it has contacted the gas stream,
(2) passing downwardly through said material a fluid of the group consisting of a liquid solvent for sulfur and gases non-reactive with said material, at temperature sufficient to dissolve sulfur when the fluid is a liquid solvent and to melt and volatilize sulfur when said fluid is gaseous, for a period of time sufficient to separate absorbed sulfur from the finely divided material, and
(3) returning the thus regenerated finely divided catalytic material as an aqueous suspension to intimately contact said gas stream.

7. A process as claimed in claim 6 in which the fluid is hot liquid xylene.

8. A process as claimed in claim 6 in which the fluid is superheated steam.

9. A process as claimed in claim 1 in which the finely divided catalytic material is activated carbon.

* * * * *